(12) United States Patent
Rudek et al.

(10) Patent No.: US 10,919,919 B2
(45) Date of Patent: Feb. 16, 2021

(54) EPOXY-FUNCTIONAL ALKOXYSILANES, METHOD FOR THE PRODUCTION AND USE THEREOF

(71) Applicant: Evonik Operations GmbH, Essen (DE)

(72) Inventors: Markus Rudek, Büttelborn (DE); Susann Witzsche, Rheinfelden (DE); Stefan Bade, Michelbach le Haut (FR); Burkhard Standke, Lörrach (DE); Reiner Störger, Seligenstadt (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/756,383

(22) PCT Filed: Sep. 26, 2018

(86) PCT No.: PCT/EP2018/076065
§ 371 (c)(1),
(2) Date: Apr. 15, 2020

(87) PCT Pub. No.: WO2019/076594
PCT Pub. Date: Apr. 25, 2019

(65) Prior Publication Data
US 2020/0331937 A1 Oct. 22, 2020

(30) Foreign Application Priority Data
Oct. 19, 2017 (EP) ..................................... 17197233

(51) Int. Cl.
*C07F 7/18* (2006.01)
*B01J 31/28* (2006.01)
*C09D 183/06* (2006.01)

(52) U.S. Cl.
CPC ............. *C07F 7/1876* (2013.01); *B01J 31/28* (2013.01); *C09D 183/06* (2013.01)

(58) Field of Classification Search
CPC ........................................................ C07F 7/20
See application file for complete search history.

(56) References Cited

U.S. PATENT DOCUMENTS 3,455,877 A 7/1969 Plueddemann
4,213,908 A 7/1980 Kötzsch et al.
(Continued)

FOREIGN PATENT DOCUMENTS

DE 21 59 991 6/1973
EP 0 288 286 10/1988
(Continued)

OTHER PUBLICATIONS

CAS Abstract and Indexed Compound Y. Israfilov et al., Issled. Obl. Sint. Polim. Monomernykh Prod., 11-16 (1979) (Year: 1979).*
(Continued)

*Primary Examiner* — Alexander R Pagano
(74) *Attorney, Agent, or Firm* — Grüneberg and Myers PLLC

(57) ABSTRACT

Novel epoxy-functional alkoxysilanes have, for example, formulae II, III, IV, V, and VI.

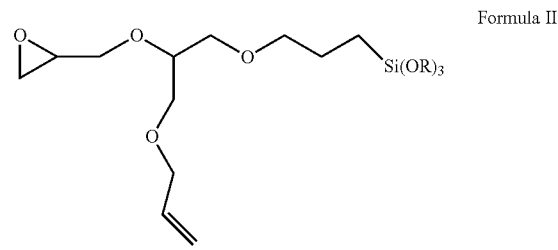

Formula II

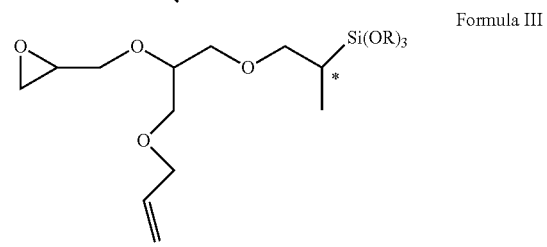

Formula III

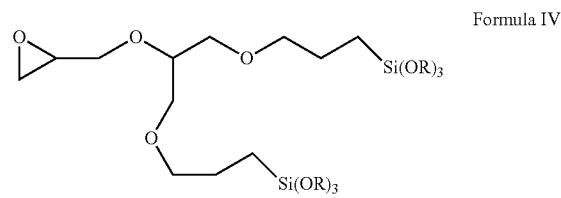

Formula IV

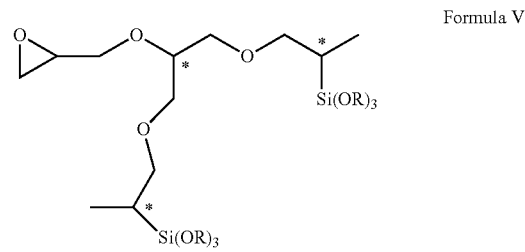

Formula V

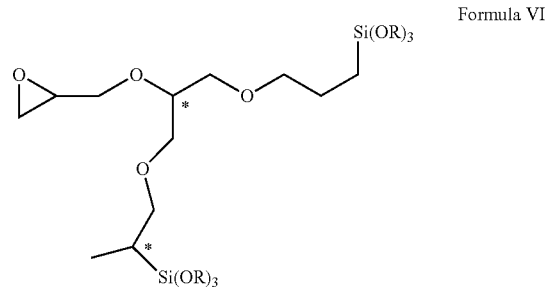

Formula VI

20 Claims, No Drawings

(56) References Cited

U.S. PATENT DOCUMENTS

| | | | | |
|---|---|---|---|---|
| 5,322,557 A * | 6/1994 | Inomata | ............... | C08J 5/125 106/287.14 |
| 6,402,961 B1 | 6/2002 | Bade et al. | | |
| 7,534,901 B2 * | 5/2009 | Crivello | ............... | C07F 7/0874 549/215 |
| 2011/0144226 A1 * | 6/2011 | Spyrou | ............... | C08L 83/04 522/91 |
| 2015/0247033 A1 * | 9/2015 | Chun | ............... | C08K 7/14 523/427 |

FOREIGN PATENT DOCUMENTS

| | | | |
|---|---|---|---|
| EP | 1 070 721 | | 1/2001 |
| JP | 2019052120 A | * | 4/2019 |
| KR | 10-2013-0109747 | | 10/2013 |
| KR | 20130109747 A | * | 10/2013 |

OTHER PUBLICATIONS

CAS Abstract and Indexed Compound R. Sultanov et al., 46 Zhurnal Obshchei Khimii, 1806-1808 (1976) (Year: 1976).*
Kimjunseok, English-Language Machine Translation KR-20130109747-A (2013) (Year: 2013).*
Okita, English-Language Machine Translation JP-2019052120-A (2019) (Year: 2019).*
International Search Report dated Nov. 7, 2018 in PCT/EP2018/076065 with English translation, 5 pages.
Written Opinion dated Nov. 7, 2018 in PCT/EP2018/076065 with English translation, 8 pages.

* cited by examiner

EPOXY-FUNCTIONAL ALKOXYSILANES, METHOD FOR THE PRODUCTION AND USE THEREOF

CROSS-REFERENCE TO RELATED APPLICATIONS

This application is a National Stage entry under § 371 of International Application No. PCT/EP2018/076065, filed on Sep. 26, 2018, and which claims the benefit of European Application No. 17197233.4, filed on Oct. 19, 2017, the contents of each of which are hereby incorporated by reference in their entireties.

The present invention relates to novel epoxy-functional alkoxysilanes or epoxy-functional alkoxysilane mixtures, to processes for the production thereof and to the use thereof.

Hydrosilylation of olefins in the presence of a catalyst are long known and important processes for producing organofunctional silanes.

DE 2851456 discloses a continuous hydrosilylation process operated in a tubular reactor through which a liquid phase of the components flows in the presence of a homogeneous-phase hydrosilylation catalyst at a pressure of up to 6 bar abs.

The production of 3-glycidyloxypropyltrialkoxysilanes is typically effected by homogeneous catalysis with a Speier's catalyst, $H_2PtCl_6$, or a Karstedt's catalyst, divinyltetramethyldisiloxane-Pt, but may also be effected by heterogeneous catalysis with noble metals (inter alia EP 0277023, EP 0288286, EP 1070721, JP 128763, DE 2159991 and EP 0548974, U.S. Pat. No. 4,736,049).

EP 0075864 and EP 0075865 relate to the production of hexafluoropropyloxysilanes and tetrafluoroethyloxyalkylsilanes by hydrosilylation in the presence of a hydrosilylation catalyst, wherein fluoro-functional olefin ethers are employed as the olefin component. These processes are also performed continuously in a tubular reactor through which a liquid phase flows at a pressure up to 6 bar abs.

Since according to EP 0652222 a Pt catalyst/Pt(0) complex catalyst which may optionally be dissolved in an inert solvent is not sufficiently active on its own a so-called promoter in the form of a peroxide must be used for activation of the catalyst to improve economy.

EP 0856517 discloses a process for hydrosilylation of an unsaturated compound in the presence of a metal compound of transition groups 8 to 10 of the periodic table. The hydrosilylation must likewise be performed in the presence of an accelerator.

SU 415268 teaches producing aminoalkylsilanes by hydrosilylation of allylamine and here too the conversion must be performed in the presence of a catalyst and with addition of an acid as a promoter, such as acetic acid.

Furthermore, EP 0985675 discloses the use of an acid as a promoter in the hydrosilylation of a hydrocarbon olefin to produce alkylsilanes. EP 0985675 mentions acetic acid as a preferred acid: cf. also U.S. Pat. No. 5,986,124 or EP 2114963.

JP 4266400B describes the production of an aromatic silane compound by hydrosilylation of an aromatic vinyl compound. The catalyst used is a platinum complex in the presence of a carboxylic acid.

EP 0587462 describes a composition composed of an unsaturated polyorganosiloxane, an organohydropolysiloxane, an acid, a platinum compound and additives, wherein the components are emulsified in water and used for surface-release treatment. The crosslinking by hydrosilylation is effected upon heating.

However it is common knowledge that an oxirane ring generally opens under the influence of an acid and thus constitutes a very reactive species. The oxirane ring is opened here either by acid catalysis or by any other nucleophiles (S. Hauptmann, "Organische Chemie", 1st ed. 1985, VEB Verlag für Grundstoffindustrie, Leipzig, pages 558 ff.).

EP 0838467 teaches initially charging the olefin component and the Pt(0) complex catalyst dissolved in xylene or toluene and metering in the hydrogenchlorosilane at room temperature, thus causing the temperature to rise sharply to about 120° C. or more. The olefin and hydrogenchlorosilane components are employed in a molar ratio of ≤1:1 here. The process may also be performed under pressure. If the reaction according to any of the recited processes does not start the entire batch is generally unusable and must be discarded, including the costly olefin component.

US 2013/0158281 discloses a process for hydrosilylation of an unsaturated compound with a silyl hydride. The catalysts used are Fe complexes, Ni complexes, Mn complexes or Co complexes.

Even the abovementioned selection of prior art shows that every mode of hydrosilylation brings a particular challenge and generally the actual natural course of events is unpredictable, particularly the more complex the compounds.

The present invention has for its object to provide novel epoxy-functional alkoxysilanes. A particular problem addressed was that of hydrosilylating the compound of formula I

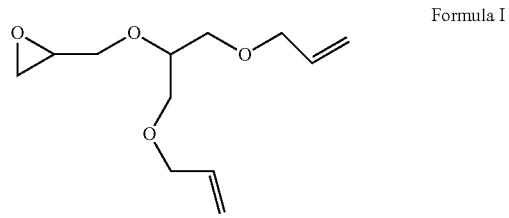 [SMILES: C=CCOCC(COCC=C)OCC1CO1]

Formula I (also referred to for short as "neoallyl-AGE" hereinbelow) if possible in respect of both of its olefin groups while substantially retaining the epoxy function of the neoallyl-AGE.

The problem is solved according to the invention by the features of the claims.

It has now been found that, surprisingly, reacting an epoxy-functional compound of formula I (hereinbelow referred to not only as neoallyl-AGE but also for short as olefin or olefin component or compound according to formula I),

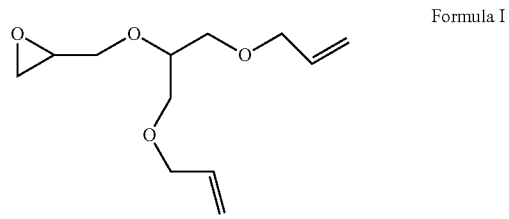 [SMILES: C=CCOCC(COCC=C)OCC1CO1]

Formula I with a hydrogentrialkoxysilane suitably employed in a molar excess in the presence of a noble-metal-containing hydrosilylation catalyst optionally with addition of at least one solvent/diluent and optionally with addition of a promoter, also known as cocatalyst, advantageously affords at least one hydrosilylation product in the form of a novel epoxy-functional alkoxysilane of formulae II, III, IV, V and/or VI

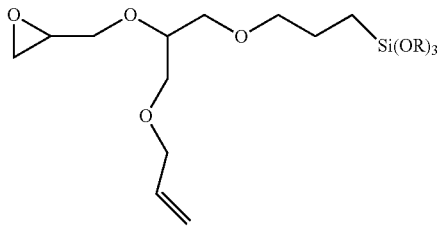

Formula II

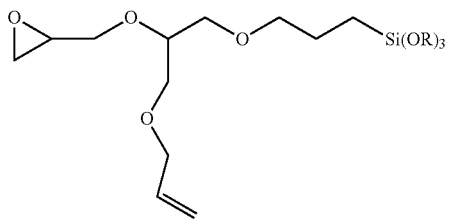

Formula II

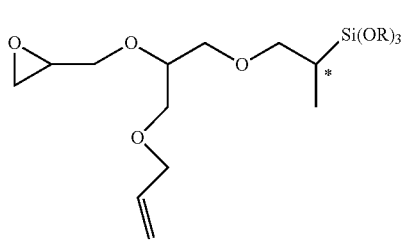

Formula III

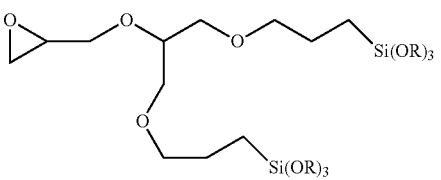

Formula IV

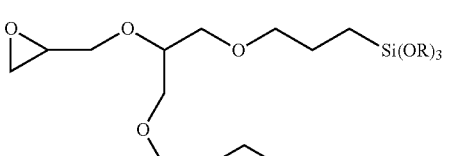

Formula III

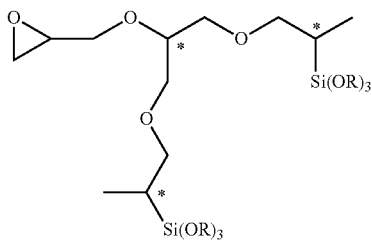

Formula IV

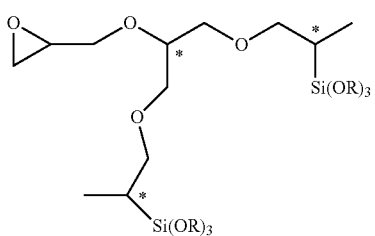

Formula V

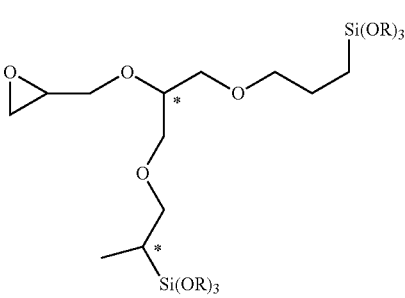

Formula V

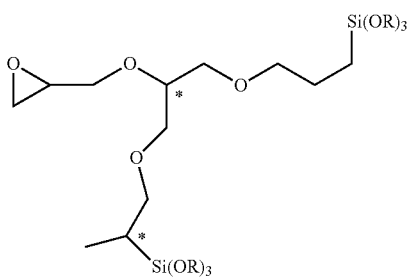

Formula VI

Formula VI wherein R in each case represents a methyl or ethyl group (note: in the above formulae chiral centres of the relevant compounds are labeled with an *), while retaining the epoxy function and makes it possible to provide in advantageous fashion novel epoxy-functional alkoxysilanes for a very wide variety of possible applications.

The present invention accordingly provides epoxy-functional alkoxysilanes of formulae II, III, IV, V and/or VI wherein R represents a methyl or ethyl group.

The present invention further provides a process for producing at least one epoxy-functional alkoxysilane of formulae II, III, IV, V or VI shown above or a mixture of at least two epoxy-functional alkoxysilanes of formulae II, III, IV, V and/or VI by reacting an epoxy-functional compound of formula I (hereinbelow referred to for short as olefin or olefin component or compound according to formula I),

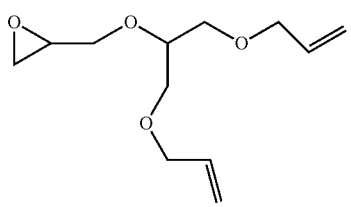

Formula I with a hydrogentrialkoxysilane
in the presence of a noble-metal-containing hydrosilylation catalyst
optionally with addition of at least one solvent/diluent
and optionally with addition of a promoter
to
subsequently obtain the hydrosilylation product,
wherein the term "the hydrosilylation product" simultaneously encompasses a mixture of hydrosilylation products and a hydrosilylation product as such.

The hydrogentrialkoxysilane employed is preferably hydrogentrimethoxysilane (TMOS) or hydrogentriethoxysilane (TEOS).

In the process according to the invention it is advantageous to use the olefin component, i.e. the compound of formula I, relative to hydrogentrialkoxysilane in a molar ratio of 1:0.8 to 1:100, preferably 1:1.8 to 1:50, particularly preferably 1:2 to 1:20, very particularly preferably 1:2.2 to 1:10, in particular 1:2.5 to 1:5.

Furthermore, in the process according to the invention the reaction is suitably performed in the presence of a noble-metal-containing hydrosilylation catalyst from the group of Pt, Pd, Rh, wherein said catalyst may be homogeneous or heterogeneous. Preference is given to a Pt-containing homogeneous catalyst, particularly preferably a Pt catalyst from the group of "Karstedt's catalyst", i.e. a platinum(0) 1,3-divinyl-1,1,3,3-tetramethyldisiloxane complex, in particular "Karstedt's catalyst" (optionally in xylene or toluene) having a content of Pt(0) of 0.01% to 20% by weight, or a catalyst based on hexachloroplatinic(IV) acid (also known as "Speier's catalyst"). However, the process according to the invention may also advantageously use a heterogeneous catalyst, wherein as a heterogeneous catalyst a noble metal on a solid catalyst support, preferably Pt supported on activated carbon, is suitable.

The process according to the invention may particularly advantageously employ the platinum hydrosilylation catalyst in the homogeneous phase. Advantageously employed to this end is in particular Pt(0) divinyltetramethyldisiloxane ("Karstedt's catalyst"), wherein the catalyst is suitably dissolved in an inert solvent such as xylene or toluene. As preferred inert solvents/diluents toluene or xylene thus prove particularly suitable in the present process. It is preferable to employ a catalyst solution having a content of platinum of 0.01% to 20% by weight in the process according to the invention.

The process according to the invention uses the noble-metal-containing homogeneous catalyst advantageously employed in a noble metal to hydrogentrialkoxysilane molar ratio of 1:1 000 000 to 1:100, preferably of 1:100 000 to 1:1000, particularly preferably of 1:50 000 to 1:5000, in particular of 1:30 000 to 1:10 000.

Suitably, the process according to the invention advantageously employs at least one solvent/diluent from the group of xylene, toluene, heptane, octane, nonane, a C7 to C9 hydrocarbons mixture or an appropriate, already available compound selected from the abovementioned hydrosilylation products as such. In the present process the reaction mixture may in particular advantageously also have an inert solvent or diluent or solvent or diluent mixture added to it, even during the reaction, for example but not limited to, xylene, toluene, heptane, octane, nonane, or a C7 to C9 hydrocarbons mixture.

Also employable in the process according to the invention is at least one so-called promoter/cocatalyst, in particular from the group of organic acids having 2 to 10 carbon atoms, for example—but not limited to—acetic acid, pentanoic acid or hexanoic acid.

In the process according to the invention the reaction is preferably performed at a temperature in the range from 80° C. to 200° C. and at a pressure up to 4 bar abs, preferably at atmospheric pressure to 2 bar abs and particularly preferably at a temperature of 90° C. to 180° C., in particular of 100° C. to 160° C. The reaction is generally exothermic and temperature monitoring and control is advantageous.

The hydrosilylation process according to the invention is generally also performed under cover of protective gas, for example under nitrogen.

The process according to the invention may suitably be performed discontinuously or else continuously in a reactor system.

To obtain the hydrosilylation product (hereinabove and hereinbelow also referred to for short as product/target product or mixture of target products) in the context of the present invention the proportions of still-present components having a boiling point below 180° C. (1 bar) may be removed from the product mixture/product-containing mixture obtained in the reaction by distillation under reduced pressure and the target product/a mixture of target products may be obtained as bottoms product from the distillation or else—depending on the boiling point of the target product—as tops product. If a heterogeneous catalyst is used for the reaction this is suitably removed before the above-described distillative workup, for example by filtration and/or centrifuging.

The process according to the invention may generally be performed such that it is performed in a reactor system, i.e. for example a stirred tank or tubular reactor system, for example a stirred tank cascade. The reactor system may be heatable and coolable and suitably comprise a stirring/mixing apparatus and/or a reflux cooler. The reactor system may furthermore be operated with an inert gas, for example nitrogen, and under pressure. The reaction and distillation apparatus may also be purged with dried nitrogen before performing the present process.

Various process variants may be employed for performing the process according to the invention.

Thus the hydrogentrialkoxysilane (also referred to as hydrogenalkoxysilane for short) and the noble metal catalyst may be initially charged and this mixture may optionally be diluted with an inert solvent and/or a promoter may be added. Such a mixture may be preheated for example to 40° C. to 160° C. and the olefin of formula I metered in, the reaction of the thus obtained reaction mixture suitably being performed at a temperature in the range from 80° C. to 200° C. and at a pressure up to 4 bar abs.

However, another possible procedure comprises initially charging the olefin of formula I, optionally diluting with a suitable solvent, adding catalyst and optionally a promoter, suitably commixing the initially charged composition, for example by stirring, heating the mixture and metering in the hydrogentrialkoxysilane, optionally diluted with an inert solvent, with mixing of the reaction mixture.

The reaction mixture/the product mixture formed in the reaction is then suitably allowed to undergo a postreaction and the thus obtained product mixture (also known as crude product) may be worked up.

If a heterogeneous catalyst is used for the reaction said catalyst may be removed from the present product mixture, optionally recycled or the noble metal recovered for example by means of a filter or centrifuge.

To obtain the target product, the product mixture/crude product/product mixture freed of the heterogeneous catalyst obtained in the reaction is worked up by distillation, wherein the proportions volatile below 180° C. at standard pressure are removed via the gas phase in a manner as gentle to the product as possible, preferably by distillation under reduced pressure (vacuum), and the (target) product according to the invention, i.e. the inventive epoxy-functional alkoxysilanes of formulae II, III, IV, V or VI or a mixture of at least two epoxy-functional alkoxysilanes from the group of formulae II, III, IV, V and VI are obtained in the bottoms, i.e. as bottoms product, or else—depending on the boiling point of the present products according to formulae II to VI—as tops product from the distillation unit used.

In addition the product according to the invention or an intermediate product of the process, for example the product mixture/reaction product, may prior to the distillation be treated via an absorbent, for example activated carbon, filtration or by means of a membrane to remove or recycle any noble metal fractions of an employed homogeneous catalyst and/or to recover the noble metal.

Thus, the novel, inventive epoxy-functional alkoxysilanes of formulae II, III, IV, V or VI or a mixture of at least two epoxy-functional alkoxysilanes from the group of formulae II, III, IV, V and VI shown above are advantageously obtainable from the process according to the invention.

Furthermore, inventive epoxy-functional alkoxysilanes of formulae II, III, IV, V or VI or a mixture of at least two epoxy-functional alkoxysilanes from the group of formulae II, III, IV, V and VI are in terms of their use suitable advantageously—but not exclusively—for modification and/or coating of surfaces, for coating of glass fibres, for coating of metals and metal alloys, for protection from corrosion, for silanization of fillers and pigments, for production of adhesives and sealants, for production of composites and/or compounds, for production of corrosion protectants, as crosslinkers, as adhesion promoters, as primers and as an additive for paints and lacquers.

The present invention is elucidated in detail by the examples which follow, without limiting the subject-matter of the invention.

EXAMPLES

Apparatus/Procedure:

The following experiments were performed as follows:

Neoallyl-AGE, TMOS, acid and Karstedt's catalyst were initially charged in a stirred reactor. The reaction mixture was heated to 160° C. (bottoms temperature) over about 30 min with stirring. After the bottoms temperature of 160° C. had been attained, the reaction mixture was held at 160° C. for a further 90 min. This was followed by cooling of the reaction/product mixture and subsequent sampling (so-called crude sample).

The obtained crude product was subsequently subjected to fractional distillation under conditions gentle to the product (vacuum) and the target products were obtained as tops/bottoms product in a fractional distillation.

Starting Materials/Abbreviations:

| | |
|---|---|
| Karstedt's catalyst | Heraeus, Pt(0) content 20.42% by weight |
| Acetic acid | Sigma-Aldrich, purity ≥99% |
| 2-Ethylhexanoic acid | ABCR; purity: 99% (also referred to as 2-EHA) |
| Acd. | Abbreviation for "acid" |
| TMOS | hydrogentrimethoxysilane, purity: 98% |
| Neoallyl-AGE | NEOALLYL ™E20G, Osaka Soda, purity >96% |
| HB | high boilers |

Analytical Methods:

Determination of Product Compositions by Gas Chromatography:

Crude sample composition (sample from the crude product after reaction)

Instrument: Agilent Technologies, 6890N GC System

Column: 19095J-123 HP5; 30 m/0.53 mm/2.65 μm

Temperature programme: 100° C.-2 min-10° C./min-275° C.-30 min

Example 1

With 2-ethylhexanoic acid without org. solvent

Neoallyl-AGE/TMOS [mol/mol]=1/2

Pt conc.=2.2 ppmw (based on total reaction mixture)

2-Ethylhexanoic acid conc.=0.57% by weight (based on total reaction mixture)

The product mixture obtained after reaction had the following composition [reported in area % as per GC analysis]:

| MeOH [%] | TMOS [%] | Tetra-methoxysilane [%] | Neoallyl-AGE [%] | Product(s) of formula IV, V and VI [%] | Product of formula II [%] | Product of formula III [%] | HB [%] |
|---|---|---|---|---|---|---|---|
| 0.5 | 2.8 | 4.1 | 1.0 | 67.8 | 12.6 | 5.7 | 5.4 |

Example 2

With acetic acid without org. solvent

Neoallyl-AGE/TMOS [mol/mol]=1/2

Pt conc.=2.6 ppmw (based on total reaction mixture)

Acetic acid conc.=0.29% by weight (based on total reaction mixture)

The product mixture obtained after reaction had the following composition [reported in area % as per GC analysis]:

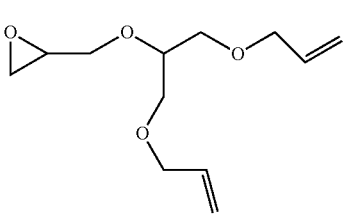

| MeOH [%] | TMOS [%] | Tetra-methoxysilane [%] | Neoallyl-AGE [%] | Product(s) of formula IV, V and VI [%] | Product of formula II [%] | Product of formula III [%] | HB [%] |
|---|---|---|---|---|---|---|---|
| 0.4 | 4.2 | 4.9 | 0.7 | 61.5 | 15.4 | 6.8 | 5.1 |

The invention claimed is:

1. An epoxy-functional alkoxysilane of formulae II, I, IV, V, and/or VI:

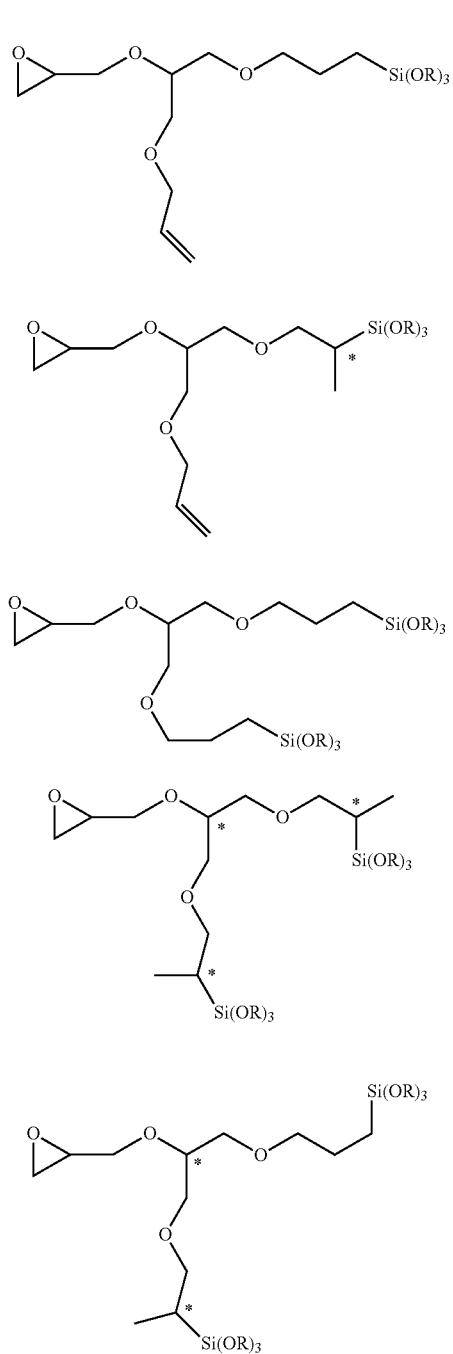

wherein R represents a methyl or an ethyl group.

2. A process for producing at least one epoxy-functional alkoxysilane selected from the group consisting of formulae II, III, IV, V, and VI according to claim 1, the process comprising:

reacting an epoxy-functional compound of formula I

Formula I with a hydrogentrialkoxysilane in the presence of a noble-metal-containing hydrosilylation catalyst,
optionally with addition of at least one solvent/diluent, and
optionally with addition of a promoter, and
subsequently obtaining a hydrosilylation product.

3. The process according to claim 2, wherein the hydrogentrialkoxysilane is hydrogentrimethoxysilane or hydrogentriethoxysilane.

4. The process according to claim 2, wherein the epoxy-functional compound of formula I relative to hydrogentrialkoxysilane is employed in a molar ratio of 1:0.8 to 1:100.

5. The process according to claim 2, wherein the reaction is performed in the presence of the noble-metal-containing hydrosilylation catalyst selected from the group consisting of Pt, Pd, Rh, and combinations thereof, and
wherein the noble-metal-containing hydrosilylation catalyst may be homogeneous or heterogeneous.

6. The process according to claim 2, wherein the noble-metal-containing hydrosilylation catalyst is a homogeneous catalyst which is employed in a noble metal to hydrogenalkoxysilane molar ratio of 1:1,000,000 to 1:100.

7. The process according to claim 2, wherein the at least one solvent/diluent is added, and is selected from the group consisting of xylene, toluene, heptane, octane, nonane, and a $C_7$ to $C_9$ hydrocarbons mixture.

8. The process according to claim 2, wherein at least one promoter is employed.

9. The process according to claim 2, wherein the reaction is performed at a temperature in a range from 80° C. to 200° C. and at a pressure up to 4 bar abs.

10. The process according to claim 2, wherein proportions of still-present components, having a boiling point below 180° C. at 1 bar, are removed from a product mixture obtained in the reaction by distillation under reduced pressure and a target product/a mixture of target products is obtained as bottoms product from the distillation, or depending on the boiling point, as tops product from a distillation unit used, and
wherein, if a heterogeneous catalyst is used for the reaction, the heterogeneous catalyst is removed before distillation.

11. The process according to claim 2, wherein the process is performed discontinuously in a stirred tank reactor.

12. An epoxy-functional alkoxysilane selected from the group consisting of formula II, III, IV, V and VI, or a mixture of at least two epoxy-functional alkoxysilanes selected from the group consisting of formulae II, III, IV, V, and VI, obtainable according to claim 2.

13. A method for modification and/or coating of surfaces, for coating of glass fibres, for coating of metals and metal alloys, for protection from corrosion, for silanization of fillers and pigments, for production of adhesives and sealants, for production of composites and/or compounds, for production of corrosion protectants, as crosslinkers, as adhesion promoters, as primers and as an additive for paints and lacquers, the method comprising:

coating or modifying surfaces with at least one epoxy-functional alkoxysilane selected from the group consisting of formula II, III, IV, V, or VI according to claim 1, or coating glass fibres, metals, or metal alloys with the at least one epoxy-functional alkoxysilane, wherein the coating protects the metals or metal alloys from corrosion, or silanizing fillers and pigments with the at least one epoxy-functional alkoxysilane, or producing adhesives, sealants, composites, compounds, and/or corrosion protectants which comprise the at least one epoxy-functional alkoxysilane, or adding the at least one epoxy-functional alkoxysilane to paints or lacquers as a crosslinker, adhesion promoter, or primer.

14. The process according to claim 4, wherein the epoxy-functional compound of formula I relative to hydrogentrialkoxysilane is employed in a molar ratio of 1:2.5 to 1:5.

15. The process according to claim 5, wherein the noble-metal-containing hydrosilylation catalyst is selected from the group consisting of a Pt-containing homogeneous catalyst, a catalyst based on hexachloroplatinic(IV) acid, or a combination thereof.

16. The process according to claim 15, wherein the noble-metal-containing hydrosilylation catalyst is Karstedt's catalyst, optionally in xylene or toluene, having a content of Pt(0) of 0.01% to 20% by weight.

17. The process according to claim 5, wherein the noble-metal-containing hydrosilylation catalyst is a noble metal applied to a solid catalyst support, as a heterogeneous catalyst.

18. The process according to claim 17, wherein the noble metal applied to the solid catalyst support is Pt supported on activated carbon.

19. The process according to claim 8, wherein the at least one promoter is selected from the group consisting of an organic acid having 2 to 10 carbon atoms, acetic acid, pentanoic acid, and hexanoic acid.

20. The process according to claim 10, wherein the heterogeneous catalyst is removed before the distillation by filtration and/or centrifuging.

\* \* \* \* \*